(12) United States Patent
Na

(10) Patent No.: US 10,731,853 B2
(45) Date of Patent: Aug. 4, 2020

(54) COMBUSTION GAS PARTICLE ADHESION PREVENTION BOILER AND METHOD

(71) Applicant: DOOSAN HEAVY INDUSTRIES & CONSTRUCTION CO., LTD., Changwon-si, Gyeongsangnam-do (KR)

(72) Inventor: Sang Gun Na, Seoul (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 148 days.

(21) Appl. No.: 16/157,037

(22) Filed: Oct. 10, 2018

(65) Prior Publication Data

US 2019/0195492 A1     Jun. 27, 2019

(30) Foreign Application Priority Data

Dec. 21, 2017   (KR) .................. 10-2017-0177475

(51) Int. Cl.
  *F23J 15/02*   (2006.01)
  *F23L 15/04*   (2006.01)
  *F23C 99/00*   (2006.01)

(52) U.S. Cl.
  CPC ........... *F23J 15/022* (2013.01); *F23C 99/001* (2013.01); *F23L 15/04* (2013.01); *F23J 2217/102* (2013.01)

(58) Field of Classification Search
  CPC .... F23J 15/022; F23J 2217/102; F23C 99/001
  See application file for complete search history.

(56) References Cited

U.S. PATENT DOCUMENTS

| 9,371,994 | B2 * | 6/2016 | Goodson ................ F23J 15/022 |
| 9,494,317 | B2 * | 11/2016 | Krichtafovitch .......... F02P 7/00 |
| 9,696,031 | B2 * | 7/2017 | Goodson ............... F23C 99/001 |

(Continued)

FOREIGN PATENT DOCUMENTS

| JP | 2013-124556 A | 6/2013 |
| JP | 2013-188708 A | 9/2013 |

(Continued)

OTHER PUBLICATIONS

A Korean Office Action dated Dec. 5, 2018 in connection with Korean Patent Application No. 10-2017-0177475 which corresponds to the above-referenced U.S. application.

*Primary Examiner* — David J Laux
(74) *Attorney, Agent, or Firm* — Invenstone Patent, LLC

(57) ABSTRACT

A combustion gas particle adhesion prevention boiler includes a furnace for containing a combustion gas and passing an exhaust gas; a dust collector for collecting combustion gas particles present in the exhaust gas; a combustion unit for combusting fuel and injecting a flame generated by the combustion into the furnace in order to generate the combustion gas; and a voltage application unit for negatively charging the fuel. The combustion gas particle adhesion prevention boiler, and a method using the same, prevent combustion gas particles generated by the combustion of fuel from being adhered to a tube, the inner wall of a furnace, etc., by applying a negative voltage to the combustion unit, and applying a positive voltage to a dust collector, such that the negatively charged combustion gas particles can be easily collected in the dust collector by the attractive force with the positively charged dust collector.

18 Claims, 8 Drawing Sheets

(56) References Cited

U.S. PATENT DOCUMENTS

| | | | | |
|---|---|---|---|---|
| 2014/0170569 A1* | 6/2014 | Anderson | ............ | F23C 99/001 |
| | | | | 431/2 |
| 2015/0107260 A1* | 4/2015 | Colannino | ................ | F02K 3/10 |
| | | | | 60/776 |
| 2016/0123577 A1* | 5/2016 | Dumas | ...................... | F23C 5/02 |
| | | | | 431/8 |

FOREIGN PATENT DOCUMENTS

| JP | 2013-245899 A | 12/2013 |
|---|---|---|
| KR | 10-0149264 B1 | 10/1998 |
| KR | 10-2006-0080998 A | 7/2006 |
| KR | 10-0837203 B1 | 6/2008 |
| KR | 10-2016-0035403 A | 3/2016 |

\* cited by examiner

[FIG. 1]
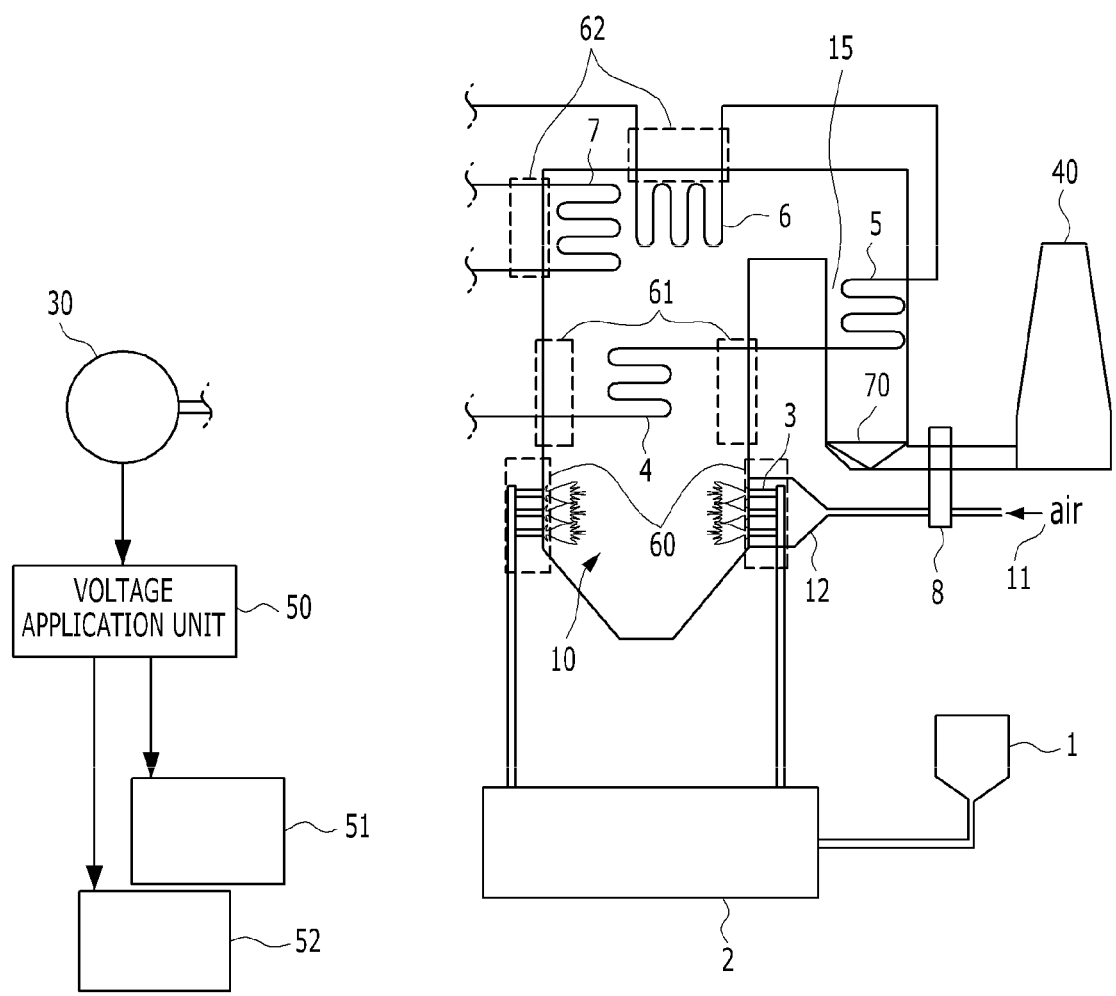

[FIG. 2]
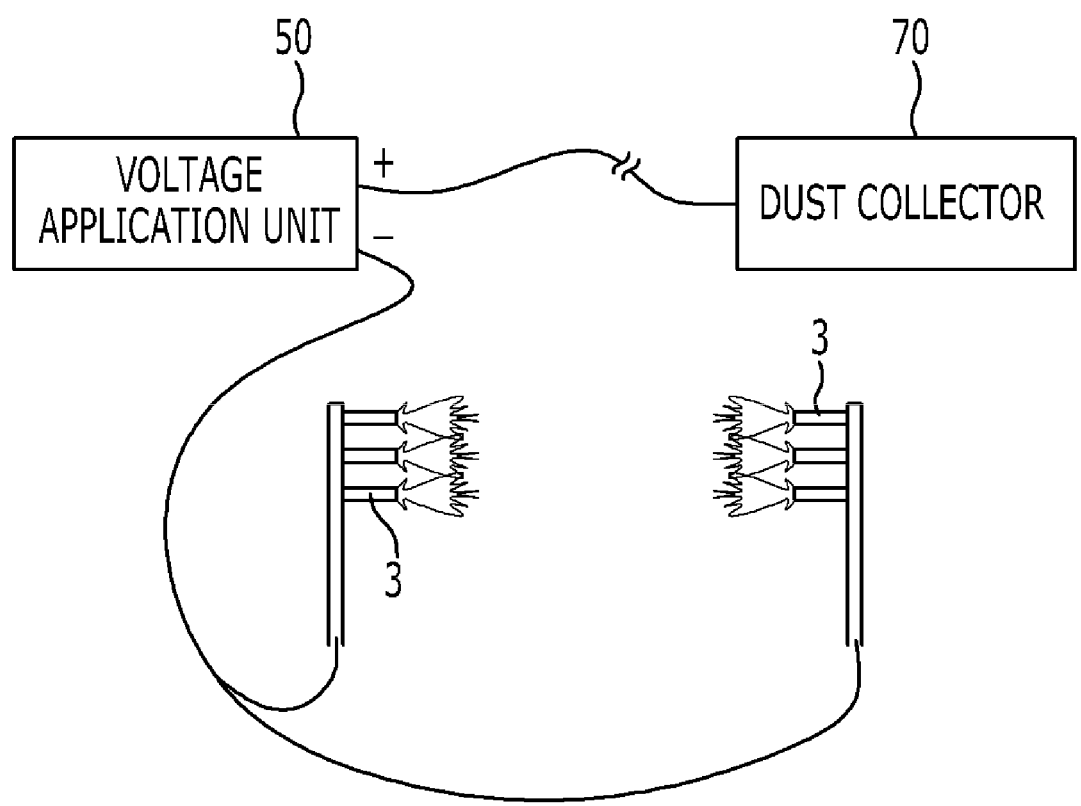

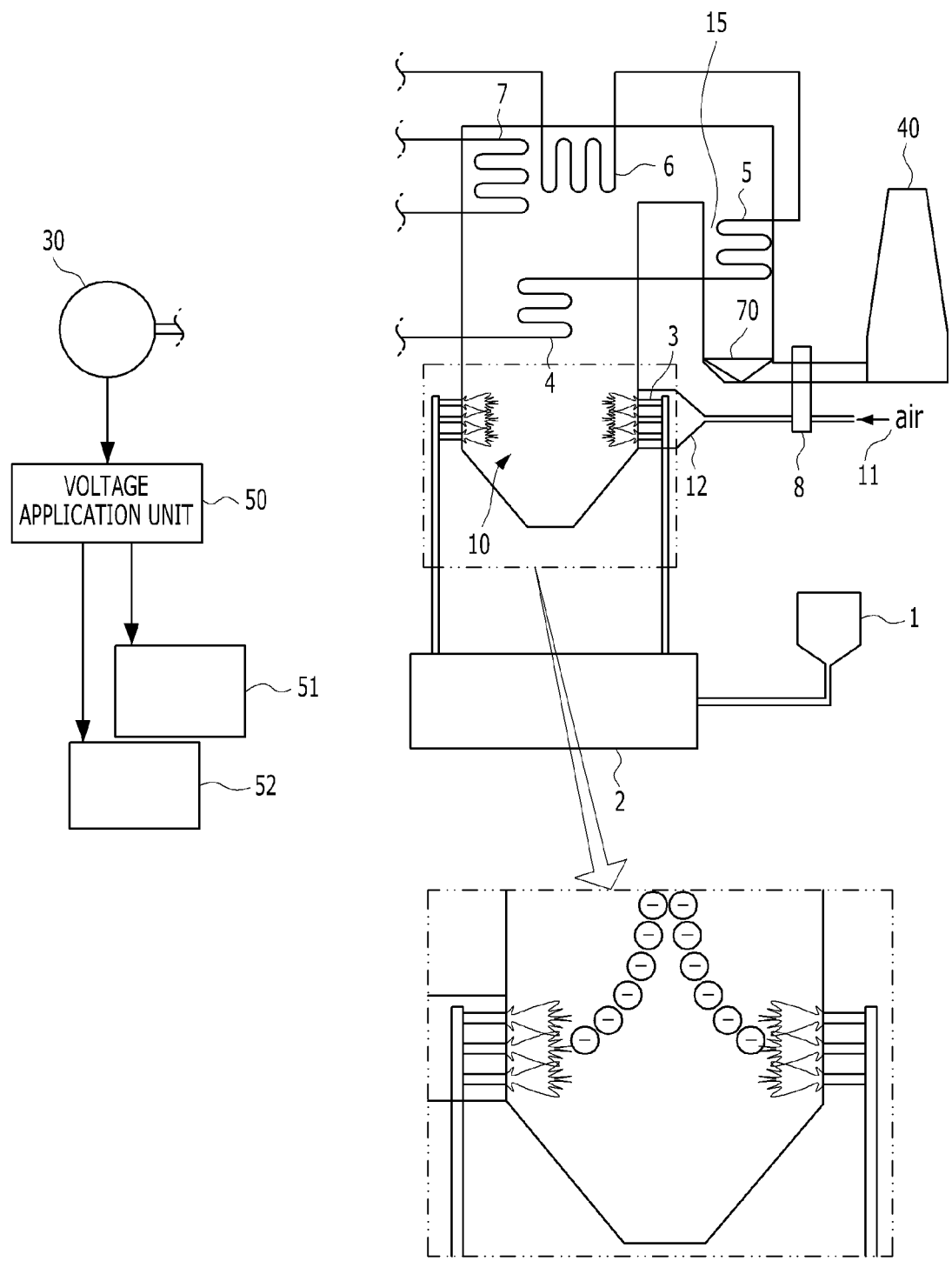
[FIG. 3]

[FIG. 4]
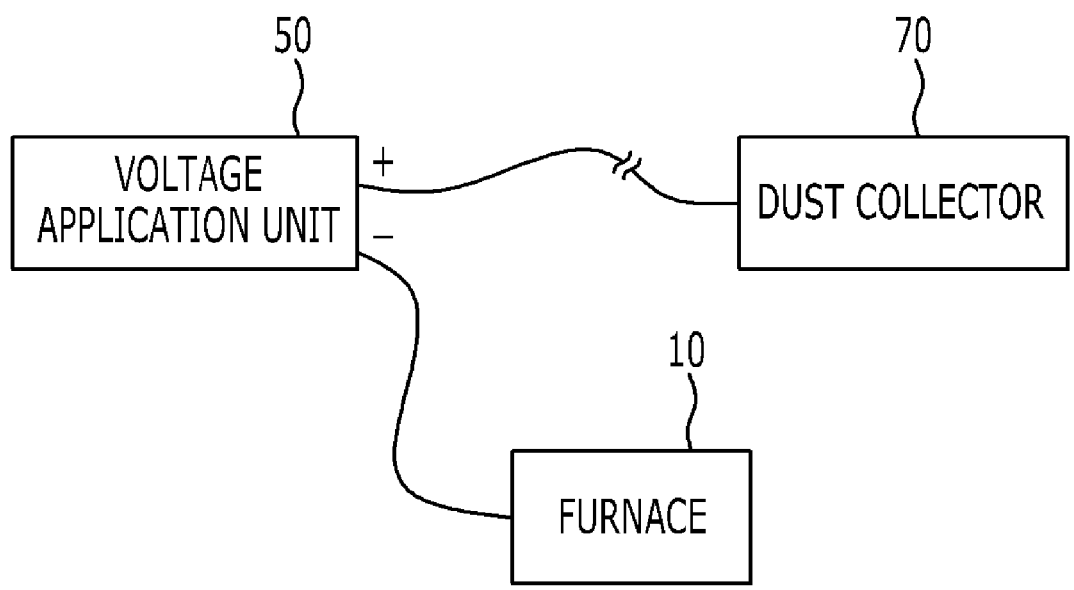

[FIG. 5]
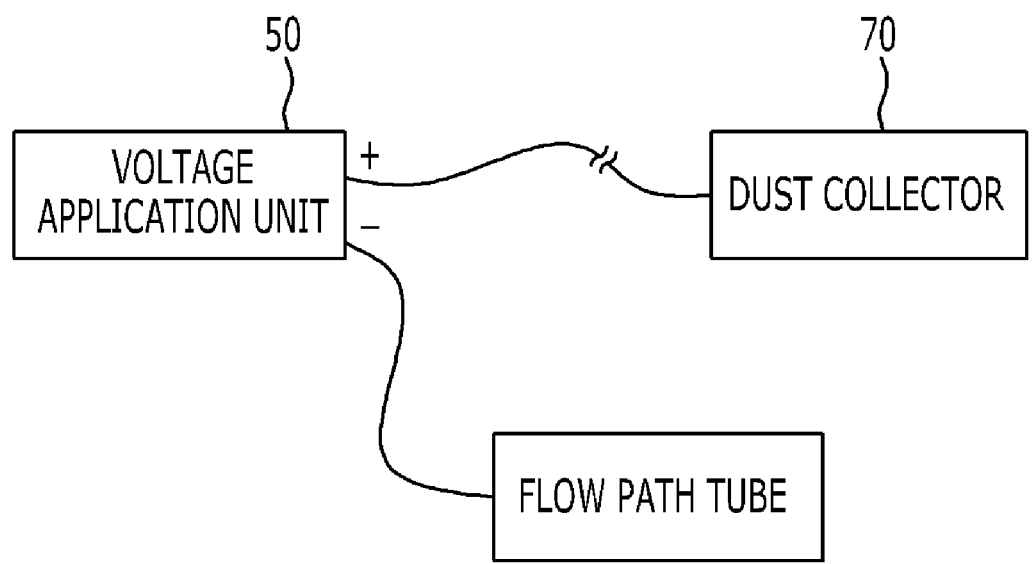

[FIG. 6]
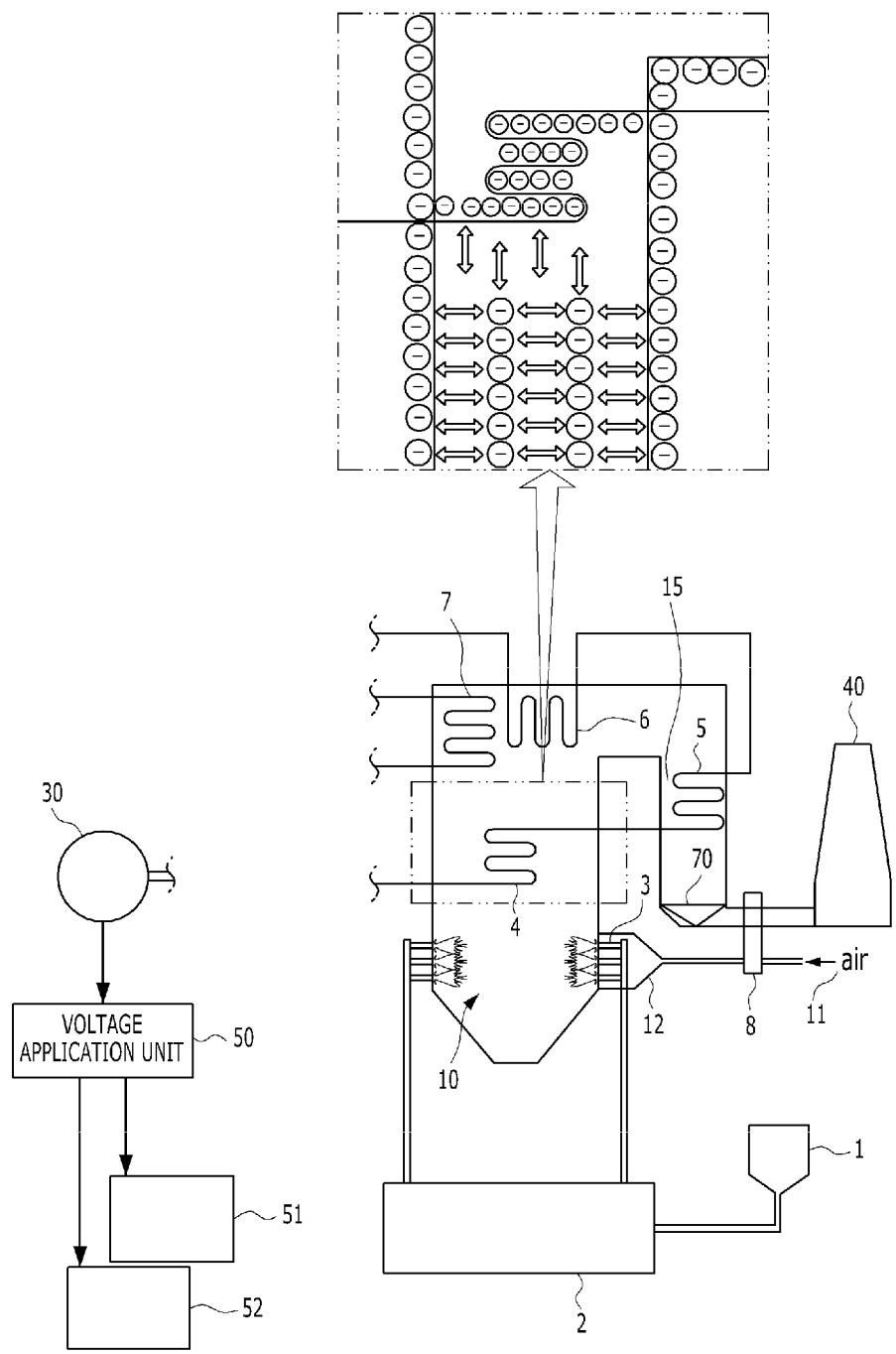

[FIG. 7]
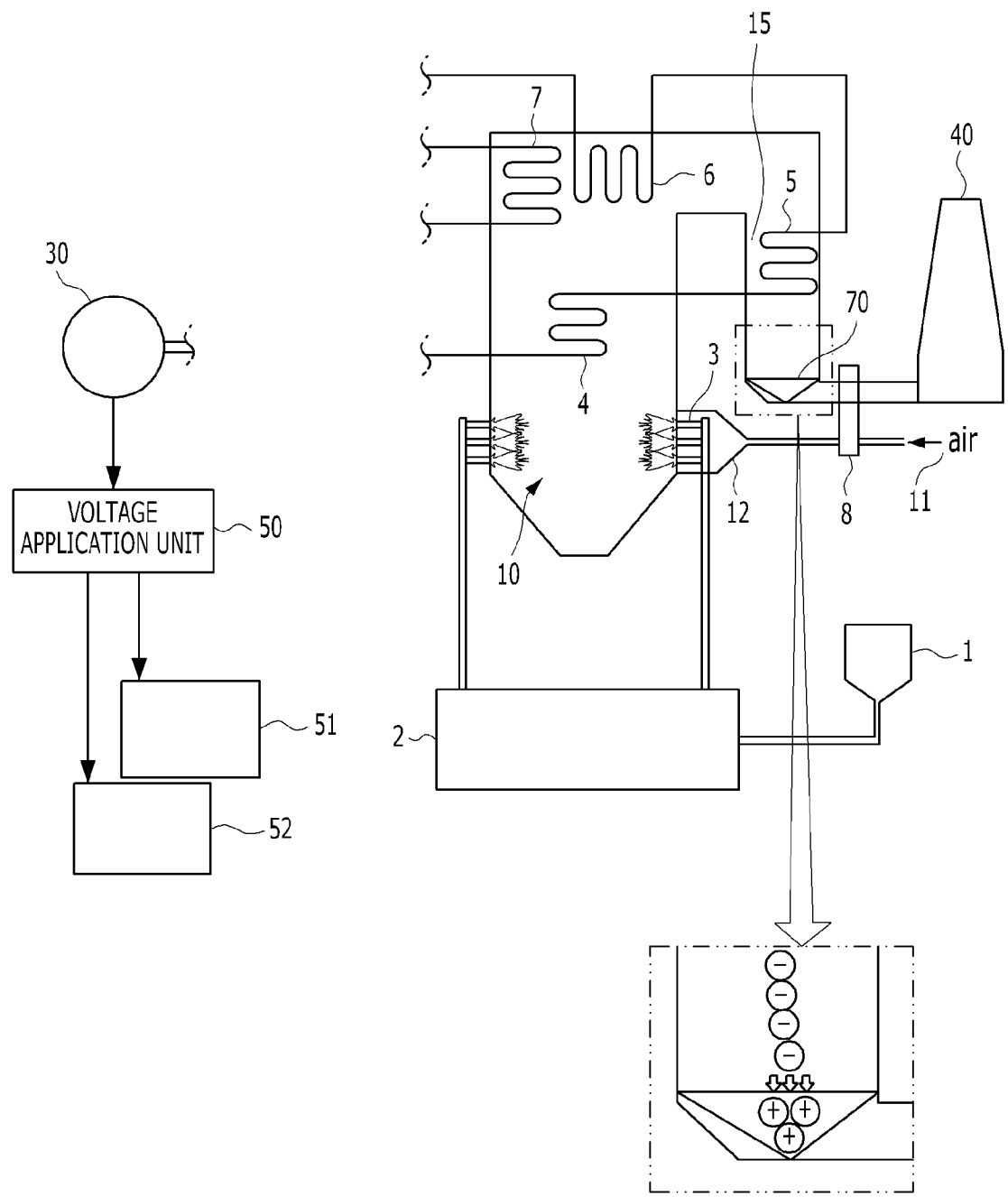

[FIG. 8]
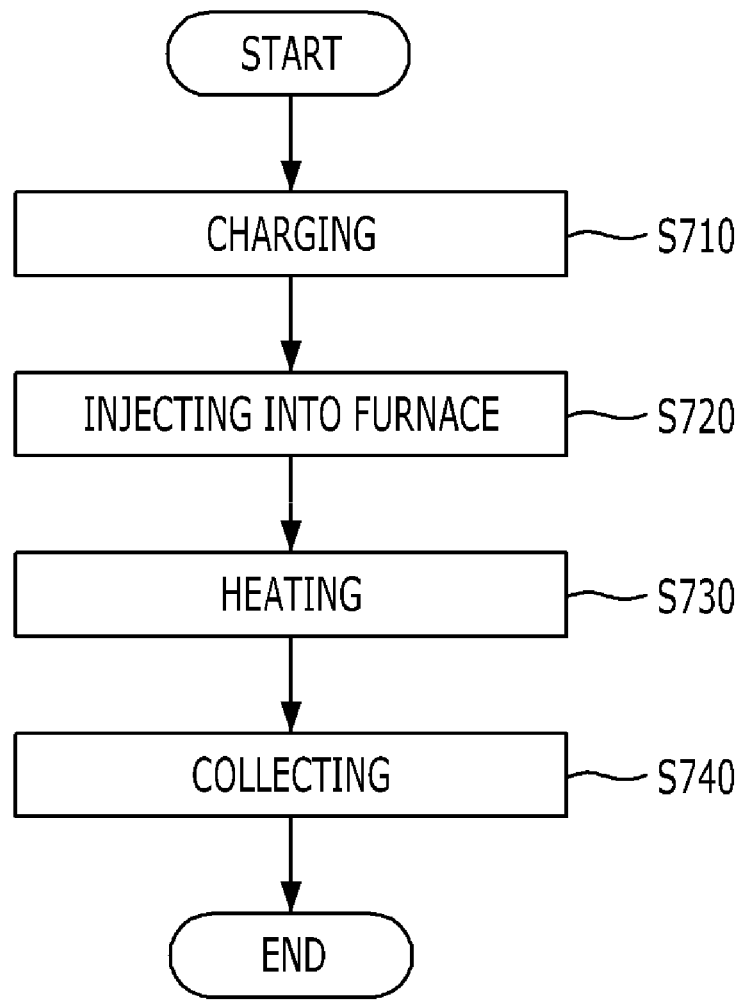

COMBUSTION GAS PARTICLE ADHESION PREVENTION BOILER AND METHOD

CROSS-REFERENCE TO RELATED APPLICATIONS

This application claims priority to Korean Patent Application No. 10-2017-0177475, filed on Dec. 21, 2017, which is incorporated herein by reference in its entirety.

BACKGROUND OF THE DISCLOSURE

Field of the Disclosure

The present disclosure relates to a combustion gas particle adhesion prevention boiler and method, and more particularly, to a combustion gas particle adhesion prevention boiler and method, which prevent combustion gas particles generated by the combustion of fuel from being adhered to a tube, the inner wall of a furnace, etc.

Description of Related Art

Generally, a power plant is an apparatus that converts fuel energy into electrical energy, and is largely composed of a boiler, a turbine, and a generator. The boiler is a device for heating water to generate vapor. Then, the turbine is rotated by the vapor generated through the boiler, and the generator generates electrical energy based on the rotation of the turbine.

According to the conventional coal-fired power boiler, the combustion gas particles generated by the combustion of fuel has been adhered to the tube inside the furnace. When the combustion gas particles are adhered to the tube, it is difficult for the heat energy to be delivered to the fluid contained in the tube, such that the temperature inside the boiler should be increased for the delivery. In addition, there is an inconvenience in using a device for generating wind, such as a soot blower, in order to remove the combustion gas particles adhered to the tube. In addition, there is an inconvenience that the combustion gas particles are adhered not only to the tube, but also to the inner wall of the furnace, such that the adhered combustion gas particles should be removed.

SUMMARY OF THE DISCLOSURE

An object of the present disclosure is to apply a negative voltage to a combustion unit for combusting fuel to negatively charge combustion gas particles generated through the combustion, and to apply a positive voltage to a dust collector for collecting the combustion gas particles, such that the negatively charged combustion gas particles can be easily collected in the dust collector by the attractive force with the positively charged dust collector.

Another object of the present disclosure is to apply a negative voltage to the combustion unit for combusting fuel to negatively charge the combustion gas particles generated through the combustion, and to apply a negative voltage to a tube through which fluid flows, such that the negatively charged combustion gas particles are not adhered to the tube by the repulsive force with the negatively charged tube.

Yet another object of the present disclosure is to apply a negative voltage to the combustion unit for combusting fuel to negatively charge the combustion gas particles generated through the combustion, and to apply a negative voltage to the inner wall of a furnace, such that the negatively charged combustion gas particles are not adhered to the inner wall of the furnace by the repulsive force with the negatively charged inner wall of the furnace.

According to one aspect of the present disclosure, a combustion gas particle adhesion prevention boiler may include a furnace for containing a combustion gas and passing an exhaust gas; a dust collector for collecting combustion gas particles present in the exhaust gas; a combustion unit for combusting fuel and injecting a flame generated by the combustion into the furnace in order to generate the combustion gas; and a voltage application unit for negatively charging the fuel. The combustion unit may include a conductor.

The voltage application unit may apply a negative voltage to the combustion unit and applies a positive voltage to the dust collector, and the voltages may be applied just before the combustion in order to reduce power waste.

The voltage application unit may respectively apply voltages to the dust collector and to the combustion unit such that the dust collector and the combustion unit have a potential difference substantively in a range of 30 to 120KV. The voltage applied to the dust collector may be a positive voltage having an amplitude of one half of the potential difference, and the voltage applied to the combustion unit may be a negative voltage having an amplitude equal to one half of the potential difference.

The voltage application unit may respectively apply voltages to the dust collector and to an inner wall of the furnace such that the dust collector and the inner wall of the furnace have a potential difference substantively in a range of 30 to 120KV. The voltage applied to the dust collector may be a positive voltage having an amplitude of one half of the potential difference, and the voltage applied to the inner wall of the furnace may be a negative voltage having an amplitude equal to one half of the potential difference.

The combustion gas particle adhesion prevention boiler may further include a flow path tube through which flows fluid heated by the heat inside the furnace, and the flow path tube may include a preheater, a fuel economizer, a superheater, and a reheater. The voltage application unit may respectively apply voltages to the dust collector and to the flow path tube such that the dust collector and the flow path tube have a potential difference substantively in a range of 30 to 120KV.

The combustion gas particle adhesion prevention boiler may further include an air preheater located on a front end of a conduit and configured to use heat remaining in the combustion gas in order to preheat air flowing in from the conduit to the combustion unit. The air preheater may be located on a front end of the dust collector to receive the heat remaining in the combustion gas.

According to another aspect of the present disclosure, there is provided a method for preventing adhesion of combustion gas particles in a boiler comprising a furnace containing a combustion gas and passing an exhaust gas, a dust collector, and a combustion unit. The method may include electrically charging fuel; combusting the electrically charged fuel to generate a flame that is injected into the furnace in order to generate the combustion gas; and collecting combustion gas particles present in the exhaust gas.

The method may further include applying a positive voltage to the dust collector, wherein the fuel is electrically charged by applying a negative voltage to the combustion unit, and the voltages may be applied just before the combustion in order to reduce power waste.

The method may further include applying a voltage to the dust collector, wherein the fuel is electrically charged by applying a voltage to the combustion unit such that the combustion unit and the dust collector have a potential difference substantively in a range of 30 to 120KV.

The method may further include respectively applying voltages to the dust collector and to an inner wall of the furnace such that the inner wall of the furnace and the dust collector have a potential difference substantively in a range of 30 to 120KV.

The boiler may further include a flow path tube through which fluid flows, and the method may further include heating the fluid in the flow path tube by the heat inside the furnace.

The method may further include respectively applying voltages to the dust collector and to the flow path tube such that the flow path tube and the dust collector have a potential difference substantively in a range of 30 to 120KV.

The present disclosure can apply a negative voltage to the combustion unit for combusting fuel to negatively charge the combustion gas particles generated through the combustion, and apply a positive voltage to the dust collector for collecting the combustion gas particles, such that the negatively charged combustion gas particles are easily collected in the dust collector by the attractive force with the positively charged dust collector.

The present disclosure can apply a negative voltage to the combustion unit for combusting fuel to negatively charge the combustion gas particles generated through the combustion, and apply a negative voltage to the tube through which fluid flows, such that the negatively charged combustion gas particles are not adhered to the tube by the repulsive force with the negatively charged tube.

The present disclosure can apply a negative voltage to the combustion unit for combusting fuel to negatively charge the combustion gas particles generated through the combustion, and apply a negative voltage to the inner wall of the furnace, such that the negatively charged combustion gas particles are not adhered to the inner wall of the furnace by the repulsive force with the negatively charged inner wall of the furnace.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a schematic diagram of a combustion gas particle adhesion prevention boiler according to an embodiment of the present disclosure;

FIG. 2 is a schematic diagram of a voltage application unit respectively applying voltages to a combustion unit and a dust collector in accordance with an embodiment of the present disclosure;

FIG. 3 is a view of FIG. 1 including a callout illustrating the negatively charged combustion gas particles;

FIG. 4 is a schematic diagram of the voltage application unit respectively applying voltages to an inner wall of a furnace and the dust collector in accordance with an embodiment of the present disclosure;

FIG. 5 is a schematic diagram of the voltage application unit respectively applying voltages to a tube (flow path tube) and the dust collector in accordance with an embodiment of the present disclosure;

FIG. 6 is a view of FIG. 1 including a callout illustrating the negatively charged combustion gas particles, the inner wall of the furnace, and the tube;

FIG. 7 is a view of FIG. 1 including a callout illustrating the negatively charged combustion gas particles and the positively charged dust collector; and FIG. 8 is a flowchart of a combustion gas particle adhesion prevention method.

DESCRIPTION OF SPECIFIC EMBODIMENTS

The foregoing and further aspects are embodied through the embodiments described with reference to the accompanying drawings. It is to be understood that the components of each embodiment are capable of various combinations within the embodiments as long as they are not mutually exclusive or mutually contradictory. In addition, the present disclosure can be implemented in many various forms and is not limited to the embodiments described herein.

In order to clearly explain the disclosure illustrated in the drawings, parts not related to the description are omitted, and like parts are denoted by similar reference numerals throughout the specification. Then, it will be understood that when an element is referred to as "comprising" another element, the element is intended not to exclude other elements, but to further include other elements unless the context clearly indicates otherwise.

The term "unit" described in the specification refers to a block configured to change or plug-in the system of hardware or software, that is, a unit or a block that performs a specific function in hardware or software.

FIG. 1 illustrates the overall configuration of a combustion gas particle adhesion prevention boiler. The combustion gas particle adhesion prevention boiler according to the present disclosure includes a voltage application unit 50 which may be connected to a generator 30.

A combustion gas particle adhesion prevention boiler includes a furnace 10 for containing a combustion gas and passing an exhaust gas; a dust collector 70 for collecting combustion gas particles contained in the exhaust gas generated in the furnace 10; a combustion unit 3 for combusting fuel and injecting the flame generated by the combustion into the furnace 10; and the voltage application unit 50 for negatively charging the fuel. The combustion gas particle adhesion prevention boiler can generate heated vapor based on fuel energy. The combustion gas particle adhesion prevention boiler can generate vapor from water through heat energy generated by combusting the fuel and rotate a turbine using the generated vapor. A generator (e.g., the generator 30) may generate electric energy based on the rotation of the turbine.

The fuel can be powdered coal, which is a solid fine powder.

The combustion gas particles can include soot produced on the inner wall of the furnace and on the outer wall of the tube (4, 5, 6, 7). In addition, the combustion gas includes fly ash. The fly ash is ash that is blown during the combustion process or the crushing process. The present disclosure is not limited to these combustion gas particles, which according to the present disclosure may include all particles generated through combustion.

The combustion unit 3 is configured to combust fuel and may be directly or indirectly connected with a coal bunker 1 (a coal silo), a crusher 2, and a conduit 12 (a duct). The coal bunker 1 can store fuel such as coal. The crusher 2 can receive the fuel stored in the coal bunker 1 to crush it.

The combustion unit 3 produces a flame by igniting the supplied fuel. Specifically, the combustion unit 3 may be configured to combust the fuel crushed by the crusher 2 and the air 11 flowed in through the conduit 12 and thereby produce the flame. The thus-produced flame can be injected into the furnace 10, and an exhaust gas can be generated in the furnace 10. The exhaust gas can contain combustion gas particles.

The voltage application unit 50 may be configured to negatively charge the fuel. Specifically, the voltage application unit 50 can receive a voltage from the electric energy generated by a generator 30 associated with the combustion gas particle adhesion prevention boiler. The generator 30 can generate electrical energy based on the rotation of the turbine. The voltage application unit 50 can convert the received electrical energy into a desired voltage, and apply the converted voltage to an object. The object can be at least one of the combustion unit 3, the inner wall of the furnace 10, the tube (hereinafter alternatively called a flow path tube), and the dust collector 70.

The dust collector 70 is located at one end of the combustion gas particle adhesion prevention boiler in accordance with the present disclosure, namely, at the exhaust end of the furnace 15, in order to collect the combustion gas particles contained in the exhaust gas. The dust collector 70 is a device for collecting and removing solid or liquid fine particles floating in the gas, and the combustion gas particles passing through the rear passage of the furnace 10 can be collected and removed by the dust collector 70.

Referring to FIG. 1, the dust collector 70 can be located at the rear end of the outlet of the furnace 10. The outlet of the furnace 10 is a section where the combustion gas particles pass through all of the tubes of the boiler and the rear end of the outlet of the furnace 10 is where the combustion gas passage becomes narrow.

FIG. 2 illustrates the voltage application unit 50 simultaneously applying voltages to the combustion unit 3 and the dust collector 70, respectively. FIG. 3 illustrates the negatively charged combustion gas particles in the combustion gas particle adhesion prevention boiler of FIG. 1. FIG. 7 illustrates the negatively charged combustion gas particles and the positively charged dust collector 70 of the combustion gas particle adhesion prevention boiler of FIG. 1.

Referring to FIG. 2, the voltage application unit 50 applies a positive voltage to the dust collector 70. Meanwhile, the voltage application unit 50 applies a negative voltage to the combustion unit 3 for injecting the flame into the furnace. That is, the combustion unit 3 itself can be a conductor, and the voltage application unit 50 can apply a negative voltage to the combustion unit 3, which is a conductor, to impart it with a negative charge. When passing through the combustion unit 3, particles of the powdered coal are negatively charged, and the negatively charged particles can pass on their charge to other particles of the powdered coal in the furnace 10 through a simple contact with the other particles.

Referring to FIG. 3, as the voltage application unit 50 applies a negative voltage to the combustion unit 3, the combustion gas particles can be negatively charged and flowed into the furnace 10. In detail, the voltage application unit 50 is configured to apply a voltage across the combustion unit 3 and the dust collector 70 and to thereby impart a potential difference substantively in the range of 30 to 120KV. A positive voltage (approx. 15 to 60KV) having half the amplitude of the potential difference may be applied to the dust collector 70, and a negative voltage (approx. −15 to −60KV) having half the amplitude of the potential difference may be applied to the combustion unit 3. Thus, the combustion gas particles generated from the combustion unit 3 to which a negative voltage is applied can be negatively charged.

All of the combustion gas particles generated from the combustion unit 3 can be negatively charged, and the minimum potential difference for generating the attractive force of the degree that the negatively charged combustion gas particles are collected by the positively charged dust collector 70 is approximately 30KV. The maximum potential difference can be limited to approximately 120KV in order to prevent insulation breakdown from occurring in the combustion gas particle adhesion prevention boiler. Insulation breakdown may occur anywhere in a configuration including the combustion gas particle adhesion prevention boiler and is characterized by a sudden surge in current due to a rapid decrease (breakdown) in electrical resistance between electrically insulated materials employed in the configuration.

FIG. 4 illustrates the voltage application unit 50 simultaneously applying voltages to an inner wall of the furnace 10 and the dust collector 70, respectively, to impart a potential difference substantively in the range of 30 to 120KV. Here, a positive voltage (approx. 15 to 60KV) having half the amplitude of the potential difference can be applied to the dust collector 70, and a negative voltage (approx. −15 to −60KV) having a half size of the potential difference can be applied to the inner wall of the furnace 10.

As described above, the minimum potential difference for generating the attractive force of the degree that the negatively charged combustion gas particles are collected by the positively charged dust collector 70 is approximately 30KV. In addition, the minimum potential difference for generating the repulsive force of the degree that the negatively charged combustion gas particles are not adhered to the negatively charged inner wall of the furnace 10 is approximately 30KV. In either application of voltage, the maximum potential difference can be limited to approximately 120kV in order to prevent insulation breakdown from occurring in the combustion gas particle adhesion prevention boiler.

Referring to FIG. 6, the combustion gas particle adhesion prevention boiler according to the present disclosure may further include flow path tubes 4, 5, 6, and 7 through which flows the fluid heated by heat exchange with an exhaust gas. The flow path tube may be configured as a tube installed inside the furnace 10 and heated by the exhaust gas and may include a preheater 4, a fuel economizer 5, a superheater 6, and a reheater 7. Each of the preheater 4, the fuel economizer 5, the superheater 6, and the reheater 7 is installed inside the furnace 10, to be heated by the exhaust gas passing through the furnace 10, and transports a heat-conductive fluid such as water or vapor.

The preheater 4 may be installed in a lower portion of the furnace 10 and may be configured to preheat the water flowing in the tube that is passed through the interior of furnace 10. The preheater 4 may be configured such that water preheated in the preheater 4 flows into the fuel economizer 5.

The fuel economizer 5 may be configured to heat water using the heat remaining in the exhaust gas to be discharged from the furnace 10 and may be interposed between the rear passage 15 of the furnace 10 and the dust collector 70. The fuel economizer 5 can be connected with the superheater 6. That is, the fuel economizer 5 may be configured such that water heated in the fuel economizer 5 flows into the superheater 6.

The superheater 6 may be configured to generate heated vapor by a high-temperature combustion gas inside the furnace 10. The superheated vapor generated in the superheater 6 rotates a high-pressure turbine, and the vapor, which has lost a predetermined amount of heat while rotating the high-pressure turbine, may thereafter flow into the reheater 7 in the furnace 10.

The reheater 7 may be configured to reheat vapor passing through the high-pressure turbine. The reheater 7 may be configured such that vapor reheated in the reheater 7 flows into an intermediate-pressure turbine to rotate the intermediate-pressure turbine. The vapor rotating the intermediate-pressure turbine exits the intermediate-pressure turbine to flow into a low-pressure turbine to rotate the low-pressure turbine.

FIG. 5 illustrates the voltage application unit 50 simultaneously applying a voltage to the flow path tube (4, 5, 6, 7) and the dust collector 70, respectively, to impart a potential difference substantively in the range of 30 to 120KV. Here, a positive voltage (approx. 15 to 60KV) having half the amplitude of the potential difference can be applied to the dust collector 70, and a negative voltage (approx. −15 to −60KV) having half the amplitude of the potential difference can be applied to the flow path tube.

As described above, the minimum potential difference for generating the attractive force of the degree that the negatively charged combustion gas particles are collected by the positively charged dust collector 70 is approximately 30KV. In addition, the minimum potential difference for generating the repulsive force of the degree that the negatively charged combustion gas particles are not adhered to the negatively charged flow path tube (4, 5, 6, 7) is approximately 30KV. In either application of voltage, the maximum potential difference can be limited to approximately 120 kV in order to prevent insulation breakdown from occurring in the combustion gas particle adhesion prevention boiler.

FIG. 6 illustrates the negatively charged combustion gas particles, the negatively charged inner wall of the furnace 10, and the negatively charged tube in the combustion gas particle adhesion prevention boiler of FIG. 1. As shown in FIG. 6, a repulsive force operates between the negatively charged combustion gas particles and the negatively charged flow path tube and inner wall of the furnace 10, such that the combustion gas particles are not adhered to the flow path tube and the inner wall of the furnace 10.

Referring again to FIG. 1, the combustion gas particle adhesion prevention boiler according to the present disclosure may further include an air preheater 8. The air preheater 8 can be located on the front end of the conduit 12, and can be also located on the front end of the dust collector 70. The air preheater 8 preheats the air flowed into the conduit 12 using the remaining heat of the combustion gas. It is possible to reduce the heat discharged to the atmosphere, thus enhancing the efficiency of the combustion gas particle adhesion prevention boiler.

As shown in FIG. 1, the combustion gas particle adhesion prevention boiler may further include a chimney 40. The chimney 40 is an accessory facility for a smoke control of ventilation and the diffusion and dilution of the exhaust gas by a combustion facility.

In order to reduce power waste, the voltage application unit 50 may be configured to apply a negative voltage to the combustion unit 3 and apply a positive voltage to the dust collector 70 just before the combustion by which the combustion gas particles are generated.

In addition, in order to reduce power waste, the voltage application unit 50 may be configured to apply a negative voltage to the inner wall of the furnace 10 that the combustion gas particles can reach first, and after a predetermined time, apply a negative voltage to the flow path tube. As a result, the voltage application unit 50 can apply a negative voltage to the combustion unit 3 and apply a positive voltage to the dust collector 70 just before the combustion and then, after one hour, apply a positive voltage to the dust collector 70. Then, the voltage application unit 50 can apply a negative voltage to the inner wall of the furnace 10 and then, after two hours, apply a negative voltage to the flow path tube.

Since the combustion gas particles have a greater possibility of directly contacting the flow path tube than the inner wall of the furnace 10, the voltage application unit 50 may be configured to apply a greater negative voltage to the flow path tube than to the inner wall of the furnace 10.

With respect to FIG. 1, a high-voltage positive charge line 51 connected with the voltage application unit 50 can be connected with the dust collector 70. Then, a high-voltage negative charge line 52 connected with the voltage application unit 50 can be connected with a combustion unit high-voltage negative charge ionizer 60 to apply a negative voltage to the combustion unit 3. Then, the high-voltage negative charge line 52 connected with the voltage application unit 50 can be connected with a furnace inner wall high-voltage negative charge ionizer 61 to apply a negative voltage to the inner wall of the furnace 10. Then, the high-voltage negative charge line 52 connected with the voltage application unit 50 can be connected with a flow path tube high-voltage negative charge ionizer 62 to apply a negative voltage to the flow path tube.

FIG. 8 illustrates a combustion gas particle adhesion prevention method.

The combustion gas particle adhesion prevention method includes negatively charging fuel by the voltage application unit (S710); combusting the fuel by the combustion unit and injecting the flame generated by the combustion into the furnace (S720); and collecting the combustion gas particles contained in the exhaust gas generated in the furnace by the dust collector (S740).

In the electrical charging step S710, the voltage application unit 50 may apply a negative voltage to the combustion unit 3 and may apply a positive voltage to the dust collector 70, as exemplified in FIG. 2. As the voltage application unit 50 applies a negative voltage to the combustion unit 3, the combustion gas particles are negatively charged and flow into the furnace 10, as can be seen in the callout of FIG. 3. The electrical charging step S710 may include the voltage application unit 50 respectively applying voltages to the combustion unit 3 and the dust collector 70 to impart them with a potential difference of 30 to 120KV, as described above with reference to FIG. 3.

The electrical charging step S710 may further include the voltage application unit 50 respectively applying voltages to the inner wall of the furnace 10 and the dust collector 70 to impart them with a potential difference of 30 to 120KV, as described above with reference to FIG. 4.

Next, in the injecting flame into the furnace in the step S720, the combustion unit 3 may combust fuel. Here, the combustion unit 3 may be configured as described above with reference to FIG. 1. In an embodiment, the injecting into the furnace in the step S720 may include the voltage application unit 50 negatively charging the fuel, and the voltage application unit 50 may be configured as described above with reference to FIG. 1.

The combustion gas particle adhesion prevention method according to the present disclosure may further include heating the fluid flowing through the flow path tubes 4, 5, 6, and 7 by the heat inside the furnace 10 (S730). Here, the flow path tube may be configured as described above with reference to FIG. 6.

Meanwhile, in the electrical charging step S710, the voltage application unit 50 may be configured to apply respective voltages to the flow path tube and the dust collector 70 to have a potential difference of 30 to 120KV, as described above with reference to FIG. 5.

With respect to the steps S710 and S720, the voltage application unit 50 can apply a negative voltage to the combustion unit 3 and apply a positive voltage to the dust collector 70 just before the combustion. In order to reduce power waste, the voltage application unit 50 can apply a negative voltage to the combustion unit 3 and apply a positive voltage to the dust collector 70 just before the combustion by which the combustion gas particles are generated.

With respect to the steps S710 and S720 and further with respect to the step 730, in order to reduce power waste, the voltage application unit 50 can apply a negative voltage to the inner wall of the furnace 10 that the combustion gas particles can reach first, and after a predetermined time, apply a negative voltage to the flow path tube. As a result, the voltage application unit 50 can apply a negative voltage to the combustion unit 3 and apply a positive voltage to the dust collector 70 just before the combustion and then, after one hour, apply a negative voltage to the inner wall of the furnace 10. Then, the voltage application unit 50 can apply a negative voltage to the inner wall of the furnace 10 and then, after two hours, apply a negative voltage to the flow path tube.

Since the combustion gas particles have a greater possibility of directly contacting the flow path tube than the inner wall of the furnace 10, the voltage application unit 50 can apply a greater negative voltage to the flow path tube than the inner wall of the furnace 10.

It should be appreciated that the above-described polarities of voltages applied by the voltage application unit 50 may be transposed, provided that the above-described potential difference is established. For example, the voltage applied to the dust collector 70 may be a negative voltage, with voltages applied to one or more of the combustion unit 3, the inner wall of the furnace 10, the flow path tube, etc. being an opposite polarity. Moreover, it should be further appreciated that the opposite-polarity voltages establishing the potential difference may include voltage levels other than those described above, i.e., the half-amplitude voltages, provided that a reference taken from one electrically charged component of the combustion gas particle adhesion prevention boiler exhibits a 30 to 120KV voltage difference with respect to the other electrically charged component.

While the present disclosure has been described with reference to an embodiment illustrated in the accompanying drawings, it is only illustrative and it can be understood to those skilled in the art that various modifications and equivalent thereof can be made. Accordingly, the true scope of the present disclosure should be defined only by the appended claims.

What is claimed is:

1. A combustion gas particle adhesion prevention boiler, comprising:
    a furnace for containing a combustion gas and passing an exhaust gas;
    a dust collector for collecting combustion gas particles present in the exhaust gas;
    a combustion unit for combusting fuel and injecting a flame generated by the combustion into the furnace in order to generate the combustion gas; and
    a voltage application unit for negatively charging the fuel and the innerwall of the furnace and for positively charging the dust collector,
    wherein the voltage application unit applies a negative voltage to the combustion unit and the inner wall of the furnace,
    wherein the voltage application unit applies a positive voltage to the dust collector, and
    wherein an electrical potential difference exists between each of the combustion unit, the inner wall of the furnace, and the dust collector.

2. The combustion gas particle adhesion prevention boiler of claim 1, wherein the combustion unit include a conductor.

3. The combustion gas particle adhesion prevention boiler of claim 1, wherein the voltages are applied just before the combustion.

4. The combustion gas particle adhesion prevention boiler of claim 1, wherein the voltage application unit respectively applies voltages to the dust collector and to the combustion unit such that the dust collector and the combustion unit have a potential difference substantively in a range of 30 to 120KV.

5. The combustion gas particle adhesion prevention boiler of claim 4, wherein the voltage applied to the dust collector is a positive voltage having an amplitude of one half of the potential difference, and the voltage applied to the combustion unit is a negative voltage having an amplitude equal to one half of the potential difference.

6. The combustion gas particle adhesion prevention boiler of claim 1, wherein the voltage application unit respectively applies voltages to the dust collector and to an inner wall of the furnace such that the dust collector and the inner wall of the furnace have a potential difference substantively in a range of 30 to 120KV.

7. The combustion gas particle adhesion prevention boiler of claim 6, wherein the voltage applied to the dust collector is a positive voltage having an amplitude of one half of the potential difference, and the voltage applied to the inner wall of the furnace is a negative voltage having an amplitude equal to one half of the potential difference.

8. The combustion gas particle adhesion prevention boiler of claim 1, further comprising a flow path tube through which flows fluid heated by the heat inside the furnace.

9. The combustion gas particle adhesion prevention boiler of claim 8, wherein the flow path tube comprises a preheater, a fuel economizer, a superheater, and a reheater.

10. The combustion gas particle adhesion prevention boiler of claim 8, wherein the voltage application unit respectively applies voltages to the dust collector and to the flow path tube such that the dust collector and the flow path tube have a potential difference substantively in a range of 30 to 120KV.

11. The combustion gas particle adhesion prevention boiler of claim 1, further comprising an air preheater located on a front end of a conduit and configured to use heat remaining in the combustion gas in order to preheat air flowing in from the conduit to the combustion unit.

12. The combustion gas particle adhesion prevention boiler of claim 11, wherein the air preheater is located on a front end of the dust collector to receive the heat remaining in the combustion gas.

13. A method for preventing adhesion of combustion gas particles in a boiler comprising a furnace having an inner wall and containing a combustion gas and passing an exhaust gas, a dust collector, and a combustion unit, the method comprising:

negatively electrically charging fuel by applying a negative electrical charge to the combustion unit;
negatively electrically charging the inner wall of the boiler, wherein the combustion unit and inner wall have a difference in electrical potential;
positively charging the dust collector;
combusting the electrically charged fuel to generate a flame that is injected into the furnace in order to generate the combustion gas; and
collecting combustion gas particles present in the exhaust gas with the positively charged dust collector.

14. The method of claim 13, wherein the voltages are applied just before the combustion.

15. The method of claim 13, further comprising:
the combustion unit and the dust collector have a potential difference substantively in a range of 30 to 120KV.

16. The method of claim 13, further comprising:
respectively applying voltages to the dust collector and to an inner wall of the furnace such that the inner wall of the furnace and the dust collector have a potential difference substantively in a range of 30 to 120KV.

17. The method of claim 13,
wherein the boiler further comprises a flow path tube through which fluid flows, and
wherein the method further comprises heating the fluid in the flow path tube by the heat inside the furnace.

18. The method of claim 17, further comprising:
respectively applying voltages to the dust collector and to the flow path tube such that the flow path tube and the dust collector have a potential difference substantively in a range of 30 to 120KV.

* * * * *